(12) United States Patent
Berkoff et al.

(10) Patent No.: US 6,803,900 B1
(45) Date of Patent: Oct. 12, 2004

(54) INPUT AND DISPLAY DEVICE

(75) Inventors: Bruce I. Berkoff, Hayward, CA (US); Hugo John Cornelissen, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 381 days.

(21) Appl. No.: 09/569,616

(22) Filed: May 12, 2000

(51) Int. Cl.$^7$ ................................. G09G 3/36
(52) U.S. Cl. ........................................ 345/102
(58) Field of Search ................... 345/102; 385/146; 362/31, 26, 561; 455/566

(56) References Cited

U.S. PATENT DOCUMENTS 5,506,929 A   4/1996   Tai et al. .................... 385/146

FOREIGN PATENT DOCUMENTS

EP   0365232 A2   4/1990   ........... G06K/11/08

*Primary Examiner*—Bipin Shalwala
*Assistant Examiner*—Prabodh Dharia
(74) *Attorney, Agent, or Firm*—Ernestine C. Bartlett

(57) ABSTRACT

Radiation from a collimated linear source (7, 8) is directed partly into a light guide structure (6) and partly glancing over the surface of the light guide structure (6). The radiation (15, 20) travelling inside the light guide is coupled out by micro-optical structures to illuminate the underlying reflective or superlying transmissive LCD. Radiation (17A, 17B) travelling across the surface outside the light guide (6) is directed towards an array of light sensitive detectors. Interruption of this radiation by a pen (21) or a finger (21) is detected and the position of the interruption is deduced.

5 Claims, 2 Drawing Sheets

INPUT AND DISPLAY DEVICE

BACKGROUND OF THE INVENTION

The invention relates to an input and a display device provided with an output screen and means for determining a position of a pointing device relative to a position at the output screen, said means for determining comprising elongated radiation sources along two substantially non-parallel sides of the output screen for radiating radiation in beams to opposing sides of the output screen, which beams are substantially parallel to a surface of the output screen.

Such a device is known from European patent application EP-A2-0.365.232 wherein is disclosed an integrated liquid crystal display with an optical touch panel. The elongated radiation sources comprise one or several conventional light emitting diodes arranged to emit a continuous beam of light along it's length. Additional illumination means are provided for illuminating the output screen.

SUMMARY OF THE INVENTION

It is an object of the present invention to provide an input and display device in which the generation of the light used for various purposes is simplified.

An input and display device according to the invention thereto is characterized in that a lighting system for the output screen is provided, which lighting system comprises a substantially flat light guide and in that the elongated radiation sources comprise means stretching along two substantially non-parallel end sides of the flat light guide for coupling radiation into the flat light guide, which means for coupling radiation into the flat light guide have radiation output windows with tangential dimensions larger than the thickness dimension of the flat light guide, which tangential dimensions are in a direction substantially orthogonal to a surface of the flat light guide, which surface of the flat light guide is substantially parallel to the surface of the output screen, and which means for coupling radiation into the flat light guide protrude above an upper one of said surfaces and have portions of the radiation output windows protruding above the upper one of said surfaces.

Thereby it is achieved that with a single light emitting element, such as a lamp or a light emitting diode both the lighting system for the output screen and the elongated radiation sources are provided with radiation.

A preferred embodiment of an input and a display device according to the invention is characterized in that at least one of the means for coupling radiation into the flat light guide comprises an elongated piece of the same material of which the flat light guide is comprised, which elongated piece is rotated over 90° about a longitudinal axis of the elongated piece relative to the orientation of the flat light guide.

Thereby it is achieved that from a manufacturing point of view a single flat element can be manufactured and subsequently be cut into pieces, one larger piece forming the flat light guide and two smaller pieces forming the means for both coupling radiation into the light guide and for providing beams substantially parallel to a surface of the output screen.

BRIEF DESCRIPTION OF THE INVENTION

The invention will now be described in more detail referring to the accompanying drawings in which.

DETAILED DESCRIPTION OF THE PREFERRED EMBODIMENT

Figure 1:
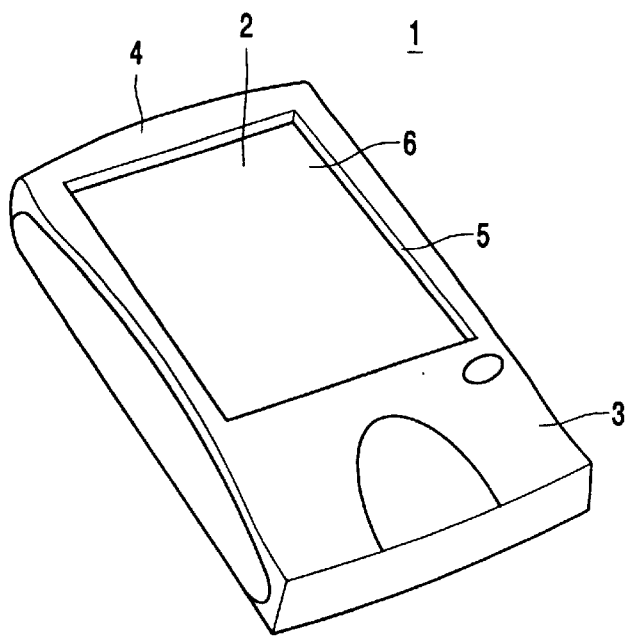
FIG. 1 shows an input and display device.

In FIG. 1 there is shown an example of a hand held pc, electronic agenda or personal digital assistant, all hereinafter referred to as hand held pc. The hand held pc 1 comprises an output screen 2, a casing 3 and two substantially non-parallel sides 4 and 5. The output screen 2 displays information for reading by an observer. Almost all hand held pc's use reflective liquid crystal displays (LCD) because of the low power requirements of such displays. For use of those products in dark environments, where there is insufficient ambient light, an auxiliary illumination is required. This can for instance be realized with a so-called front lighting system, consisting of a side illuminated light guide placed on top of the display. In the light guide micro-optical structures are present which give a preferential out-coupling of the light towards a display. The light guide is indicated in FIG. 1 by reference number 6 and in case of the use of reflective LCD's for the output screen 2 is on top of the output screen 2, i.e. between the output screen 2 and the observer. It is known, for example from U.S. Pat. No. 5,506,929 to make use of two point-like light sources. The radiation emitted by the point-like light sources is coupled into two elongated light pipes. The light pipes are provided with optical microstructures which cause the light in the light pipes to be directed into the direction of a flat light guide, such as flat light guide 6 (FIG. 1).

Figure 2:
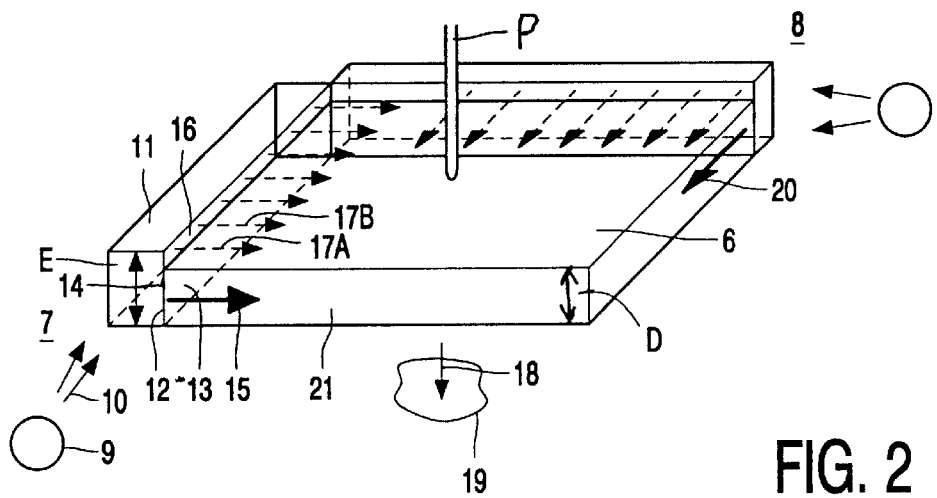
FIG. 2 shows a lighting system according to the invention.

FIG. 2 shows a preferred embodiment of a part of an input and display device according to the invention, in particular it shows the flat light guide 6 together with corresponding elongated radiation sources 7 and 8. In the embodiment shown in FIG. 2 the elongated radiation sources 7 and 8 are identically of construction, so only one of them, 7, will described in more detail. Elongated radiation source 7 comprises a point-like radiation source 9, such as for example a light emitting diode. Radiation 10 emitted by the point-like radiation source 9 is emitted in the direction of a light pipe 11. Light pipe 11 is disposed with a side 12 to an input side 13 of flat light guide 6. Means to couple radiation 10 from radiation source 9 into light guide 11 are known as such, see e.g. U.S. Pat No. 5,506,929, to a person skilled in the art, and do not form a part of the present invention and therefore will not be further described in here. As is known in the art a surface 14 of the light guide 11 is provided with micro-optical surface structures which cause radiation 10 to be reflected in the direction of the arrow 15 into the flat light guide 6.

A thickness dimension of the flat light guide 6 is indicated by "D". A tangential dimension E of the light guide 11, which is a dimension of the surface 12 in the same direction as the thickness dimension of the flat light guide 6 is larger than the dimension D. A portion 16 of the side 2 protrudes above the flat light guide 6. The micro-optical structure on the surface 14 of the light guide 11 also directs light out of the surface 16, i.e. the surface part 16 forms a radiation output window in a portion of the light guide 11 protruding above an upper surface of the flat light guide 6. As indicated by arrows 17A, 17B, etc., substantially parallel, beams of radiation or emitted by the surface 16 of the light guide 11.

A corresponding construction is shown in FIG. 2 as elongated radiation source 8. The flat light guide 6, which is known as such, for example from U.S. Pat. No. 5,506,929, directs the radiation 15 equally across its surface in the direction of arrow 18 to illuminate a reflective LCD schematically indicated by reference number 19.

Along sides 20 and 21 of the flat light guide 6 detectors, which are known as such, are provided for detecting any of the light beams 17A, 17B, etc. to determine in two directions the location of a pointing device, schematically indicated by the reference letter P, such as a pen or a finger. The determination, based upon the locations of the 'shadows' of the pointing device on the detectors, of the exact position of the pointing device relative to a position at the output screen 19 is known to a person skilled in the art and does not form part of the present invention.

Figure 2A:
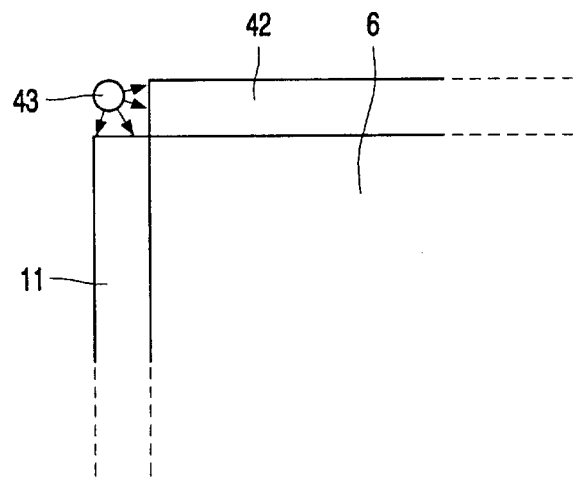
FIG. 2a shows a further lighting system according to the invention.

FIG. 2a shows a still more compact solution for inputting light into the light guide 11 and its corresponding structure of elongated radiation source 8, indicated by the reference numeral 42. In a corner between the light guides 11 and 42 a single radiation source 43 is located. Radiation source 43 is preferably point-like and radiates both in the direction of light guide 11 as well as in the direction of light guide 42.

Figure 3A:
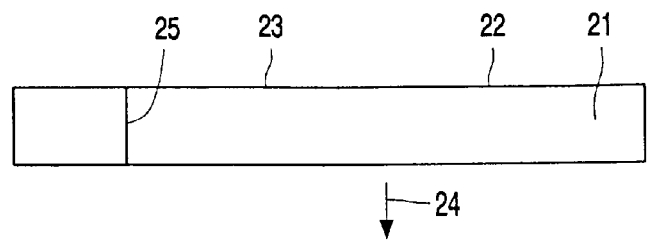
FIG. 3 shows a way of manufacturing a lighting system and elongated radiation sources from a single slab of material.
Figure 3B:
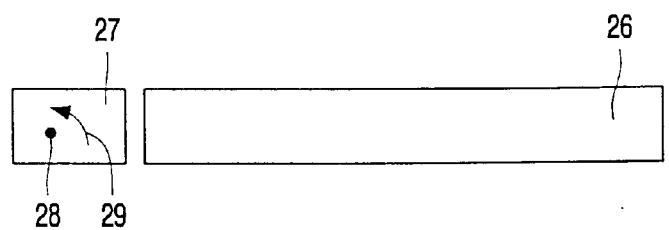
Figure 3C:
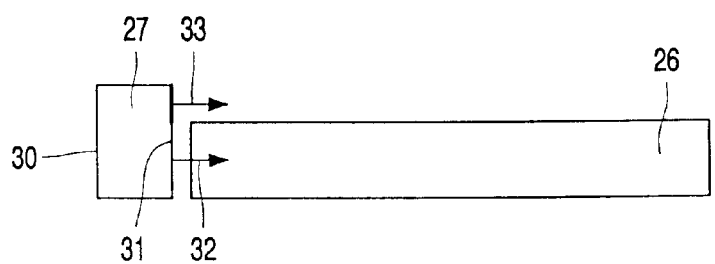
Figure 3D:
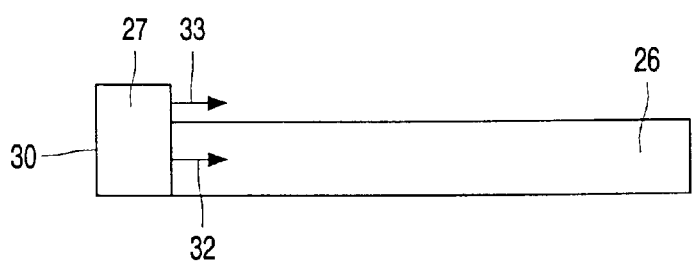

FIGS. 3A through 3D show an advantageous way of manufacturing a flat light guide 6 with a light pipe 11. FIG. 3A shows a slab of material 21 which at an upper side 22 is provided with micro-optical structures 23. As is well known to a person skilled in the art micro-optical structures 23, which are at the surface 22 or inside the body of material 21 parallel to the surface 22, operate to direct radiation which is present in the material 21 in a direction that does not differ too much from a horizontal direction into the direction of the arrow 24. Line 25 indicates a position at which the slab 21 will be cut in two parts. After cutting the slab 21 is divided in two parts 26 and 27 as shown in FIG. 3B. Thereafter part 27 is rotated about axis 28 (perpendicular to the plane of the drawing) in the direction of arrow 29. Thereafter the situation is as shown in FIG. 3C. It is to be noted that the optical micro-structure 23 now is present at the left hand side of element 27 as indicated by reference number 30. As a consequence any light entering the piece of material 27 in a direction more or less parallel to the axis 28 will be directed by the optical micro-structure 30 to pass through surface 31 in the direction of the arrows 32 and 33. The next phase is to fit part 27 in the orientation shown in FIG. 3C to the part 26, the result of which is shown in FIG. 3D.

Figure 4:
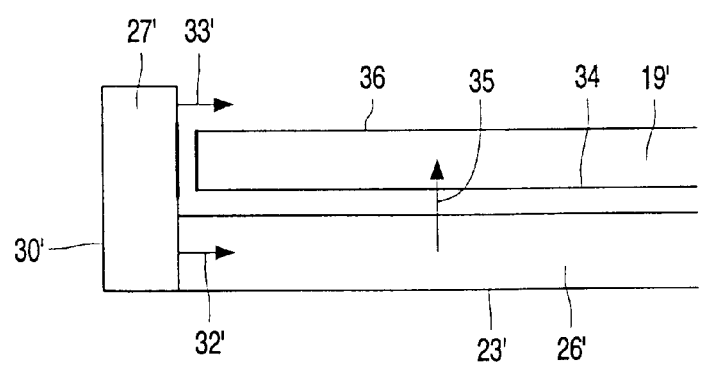
FIG. 4 shows an application of a lighting system with a transmissive liquid crystal display.

FIG. 4 shows a further embodiment of the invention in which a transmissive LCD 19' is illuminated from its back side 34. A flat light guide 26' is provided with optical micro-structure 23' either at its lower surface or in the bulk of the material of the flat light guide 26'. As herein before in relation to FIG. 3 a part 27' of a slab of material 26' has been cut of. A micro-optical structure 30' directs radiation into the direction of the arrows 32' and 33'. Radiation in the direction of the arrow 32' is directed by the micro-optical structure 23' into the direction of the transmissive LCD 19' as indicated by the arrow 35. Radiation that passes through output windows in portion 27' protruding above an upper surface of transmissive LCD 19' passes over 19' as, substantially parallel, beams that are substantially parallel surface 36 of transmissive LCD 19'.

What is claimed is:

1. Input and display device provided with an output screen and means for determining a position of a pointing device relative to a position at the output screen, said means for determining comprising elongated radiation sources along two substantially non-parallel sides of the output screen for radiating radiation in beams to opposing sides of the output screen, which beams are substantially parallel to a surface of the output screen characterized in that a lighting system for the output screen is provided, which lighting system comprises a substantially flat light guide and in that the substantially elongated radiation sources comprise means stretching along two substantially non-parallel end sides of the flat light guide for coupling radiation into the flat light guide, which means for coupling radiation into the flat light guide have radiation output windows with tangential dimensions (E) larger than a thickness dimension (D) of the flat light guide, which tangential dimensions (E) are in a direction substantially orthogonal to a surface of the flat light guide, which surface of the flat light guide is substantially parallel to the surface of the output screen, and which means for coupling radiation into the flat light guide protrude above an upper one of said surfaces and have portions of the radiation windows protruding above the upper one of said surfaces.

2. Device according to claim 1, wherein at least one of the means for coupling radiation into the flat light guide comprises an elongated piece of the same material of which the flat light guide is comprised, which elongated piece has an orientation that is rotated over 90° about a longitudinal axis of the elongated piece relative to the orientation of the flat light guide.

3. Device according to claim 1, wherein the means stretching along two substantially non-parallel end sides of the flat light guide comprise elongated light pipes and point-like radiation sources provided near ends of the elongated light pipes, which point-like radiation sources are optically coupled to cross ends of the elongated light pipes, each elongated light pipe being provided with an optical structure along a longitudinal side for directing radiation impinging on the optical structure into a direction substantially orthogonal to a longitudinal axis of the relevant elongated light pipe.

4. Device according to claim 3, wherein the point-like radiation sources comprise light emitting diodes.

5. Device according to claim 3, wherein a direction substantially orthogonal to a longitudinal axis of a relevant light pipe is substantially parallel to the surface of the output screen.

* * * * *